(No Model.)
F. NIESEN.
CATCH BASIN.
No. 433,134. Patented July 29, 1890.
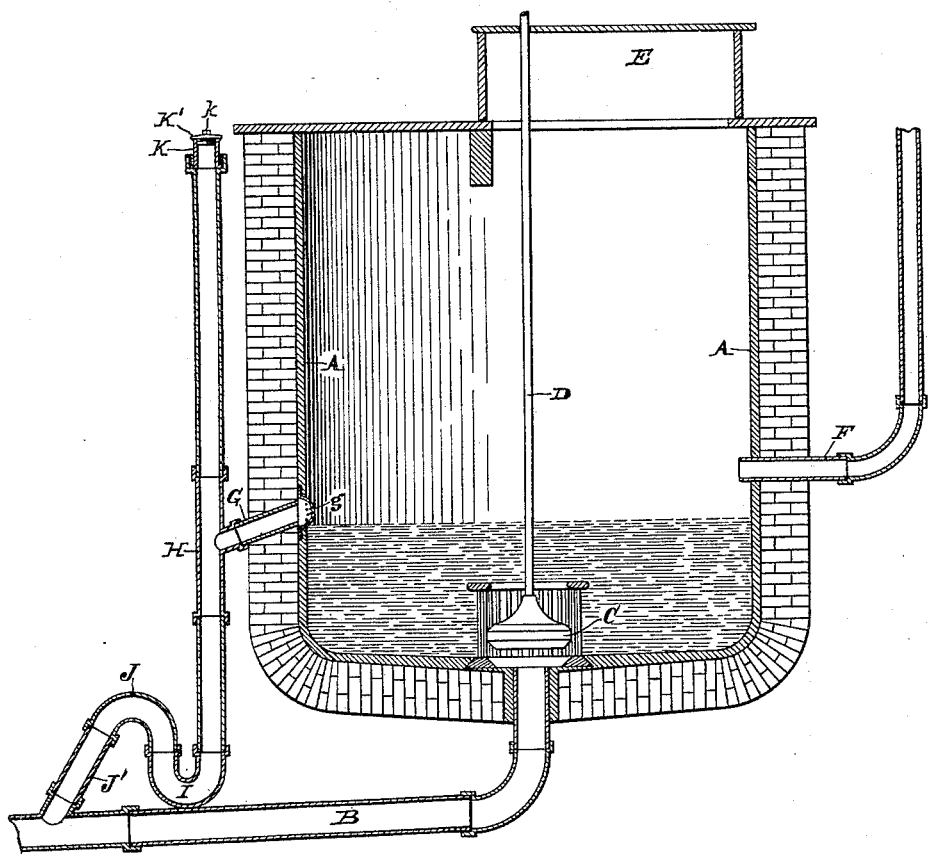
Witnesses
Dwight Benton Jr
F. L. Millward
Inventor
Frank Niesen
By his Attorney Geo. J. Murray

UNITED STATES PATENT OFFICE.

FRANK NIESEN, OF CINCINNATI, OHIO.

CATCH-BASIN.

SPECIFICATION forming part of Letters Patent No. 433,134, dated July 29, 1890.

Application filed March 31, 1890. Serial No. 345,930. (No model.)

*To all whom it may concern:*

Be it known that I, FRANK NIESEN, a citizen of the United States, and a resident of Cincinnati, in the county of Hamilton and State of Ohio, have invented certain new and useful Improvements in Catch-Basins, of which the following is a specification.

My invention relates to that class of catch-basins which are used in place of privies or water-closets for dwellings and other buildings. Its object is to prevent the trap from becoming clogged, and to readily remove any substances which may be carried into the trap, and avoid the necessity of digging down to the trap in order to cleanse it.

The invention will be readily understood from the following description of the accompanying drawing, which is a central vertical section of a catch-basin and connecting-pipes constructed according to my invention.

The basin A, with its central discharge-opening connected to the pipe B, leading to the sewer, the valve C, guarding the opening from the basin to the sewer, and the pull-rod D for said valve, extending up through the privy-seat E, are of ordinary construction, and need not, therefore, be specifically described. In this class of basins it is desirable that all the waste water from the yard, sink, bath-tubs, or roof of the building be discharged into the basin, in order that the deposits may be dissolved and carried off through the overflow-pipe. In order that these substances may be readily carried off, the opening to the overflow is guarded with an open grating through which sticks or similar substances which are liable to clog the trap may also pass. In the old form these were liable to assume a horizontal position in the trap and could only be removed with difficulty through a branch extending up from the vertical center of the trap. If such central branch were not provided, the only means of removing such obstructions from the trap was by digging down to it. All of these difficulties and inconveniences are overcome by my invention.

The pipe F conveys all the waste water to the basin A. This pipe is tapped into the basin at a point above the opening from the basin to the overflow-pipe G, the entrance to which is guarded by the grated cap *g*. The overflow-pipe empties into a vertical pipe H, which is arranged alongside of the basin. The lower end of this pipe H terminates in one branch of the U-shaped trap I. The opposite branch of the trap connects through the elbow J and branch J′ with the pipe B, which leads to the sewer.

The upper end of pipe H is fitted with a metal plug-box K, preferably of brass or other metal capable of resisting oxidation, within which is fitted a screw-plug K′ of the same metal. This cap or plug has an upward angular extension *k* to receive a wrench or key by which the cap-plug K′ is readily secured in place or removed. A loose cap or cover would answer the same purpose as the screw plug or cap, but it is better to use the plug, which requires a wrench or key to remove it, so as to prevent children from lifting it off and dropping foreign matter into the pipe H.

Now it will be seen that should any sticks or similar substances get into the overflow-pipe G and thence into the trap they would rest in nearly a vertical position. The short curve of the trap will prevent them from assuming a horizontal position, and they can be readily removed through the pipe H by tongs, or should the trap become clogged by paper, rags, or similar substances it is only necessary to remove the cap K′ and push a plunger down through pipe H and force the trap.

I claim—

1. The combination of the basin A, having the central discharge leading to the sewer-pipe, the sewer-pipe B, the vertical pipe H, arranged alongside of the basin, the branch G, connecting the basin and pipe H, the U-shaped trap or union I, one branch of which is connected to said pipe H, the elbow-joint J, connected to the other branch of trap I, and the branch or section J′, connecting the trap and sewer-pipe, substantially as shown and described.

2. The combination, substantially as specified, of the catch-basin and sewer-connections, with the pipe H, arranged alongside of the basin, the overflow-pipe connecting the basin and pipe H, the U-shaped trap I, and sewer-connections at the lower end of said pipe H and the metal plug-box K and its plug K′ at the upper end.

FRANK NIESEN.

Witnesses:
GEO. J. MURRAY,
F. L. MILLWARD.